J. A. HERRICK.
GAS PRODUCER.
APPLICATION FILED MAR. 26, 1909.

1,162,357.

Patented Nov. 30, 1915.
5 SHEETS—SHEET 1.

J. A. HERRICK.
GAS PRODUCER.
APPLICATION FILED MAR. 26, 1909.

1,162,357.

Patented Nov. 30, 1915.
5 SHEETS—SHEET 4.

James A. Herrick.
Inventor

Witnesses:

By his Attorneys
Wilson, Kent & Ramsey

J. A. HERRICK.
GAS PRODUCER.
APPLICATION FILED MAR. 26, 1909.

1,162,357.

Patented Nov. 30, 1915.
5 SHEETS—SHEET 5.

Witnesses:
G. Robert Thomas
J. Clyde Ripley

Inventor:
James A. Herrick
By his Attorneys
Wilson, Kent & Ramsey

UNITED STATES PATENT OFFICE.

JAMES A. HERRICK, OF NEW YORK, N. Y.

GAS-PRODUCER.

1,162,357.  Specification of Letters Patent.  Patented Nov. 30, 1915.

Application filed March 26, 1909. Serial No. 485,992.

*To all whom it may concern:*

Be it known that I, JAMES A. HERRICK, residing at New York, in the county of New York, State of New York, have invented certain new and useful Improvements in Gas-Producers, of which the following is a specification.

This invention relates to the production of gas and one of the objects thereof is to provide a producer wherein a greater volume of permanent, inflammable gas will be produced from a given amount of fuel than has been obtained in producers as heretofore constructed.

Another object is to provide means for producing a more uniform distribution of fuel.

Other objects will be in part obvious and in part pointed out hereinafter.

The invention accordingly consists in features of construction, combinations of elements and arrangement of parts, which will be exemplified in the construction hereinafter described, and the scope of the application of which will be indicated in the following claims.

Figure 1:
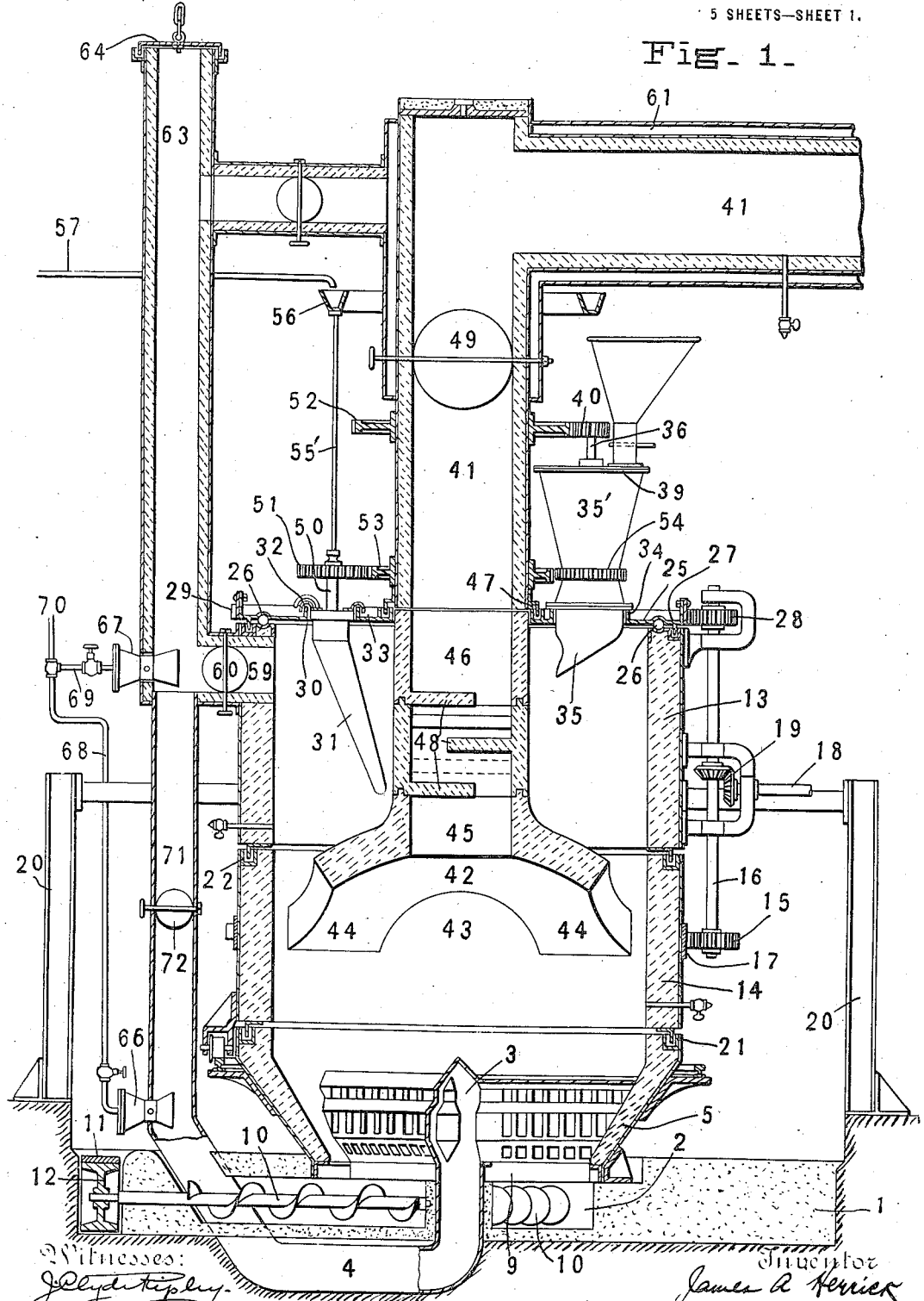
Figure 2:
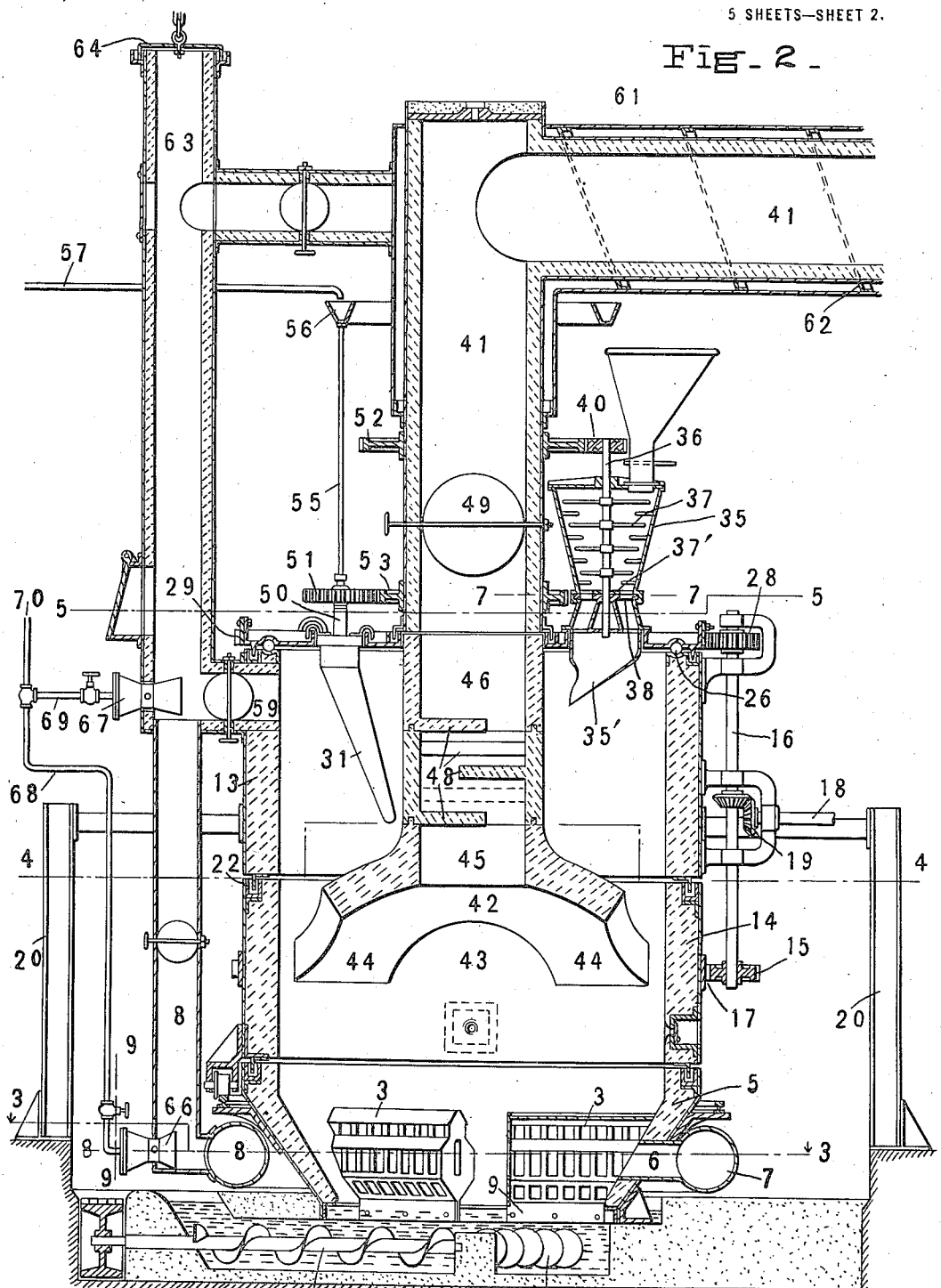
Figure 3:
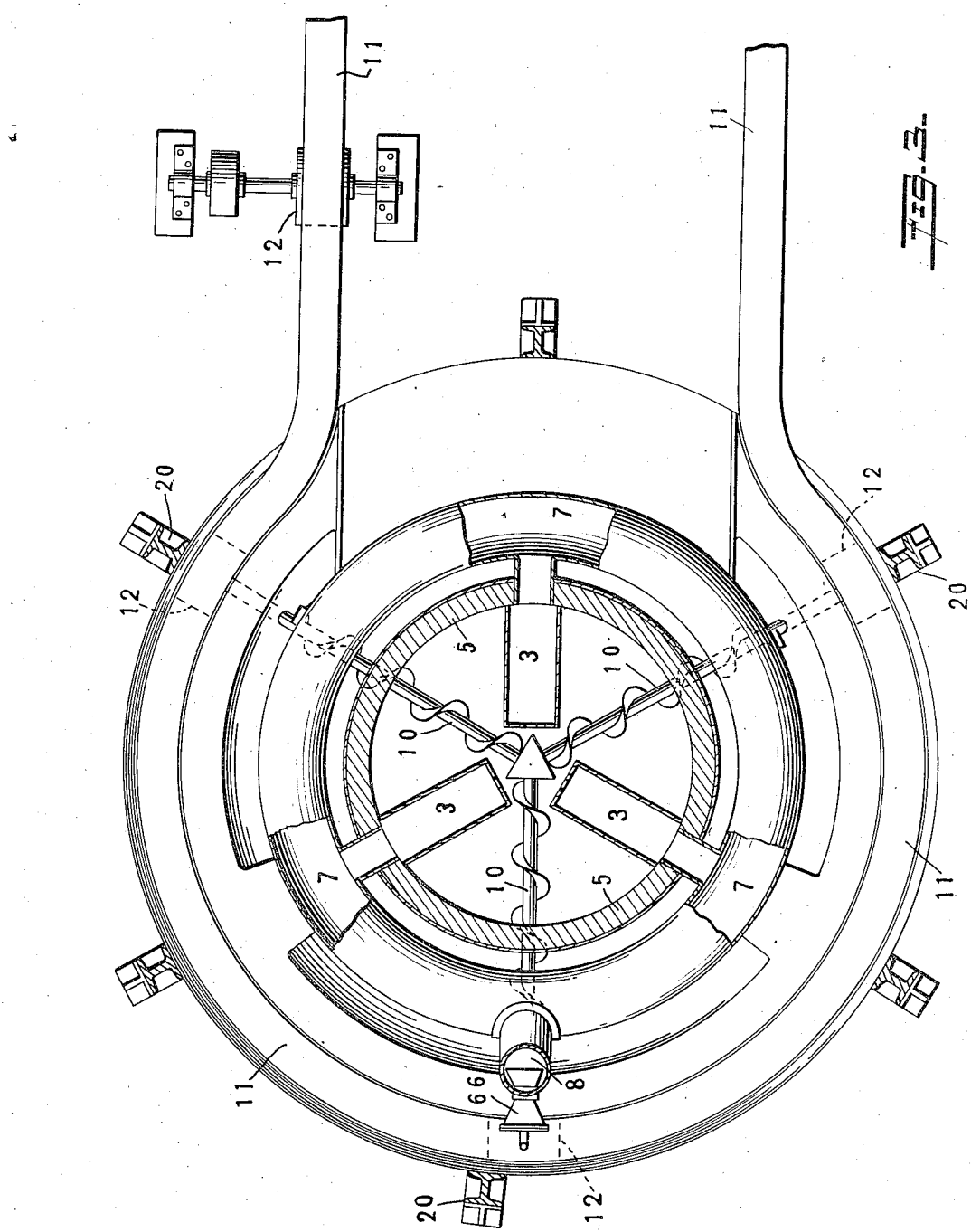
Figure 4:
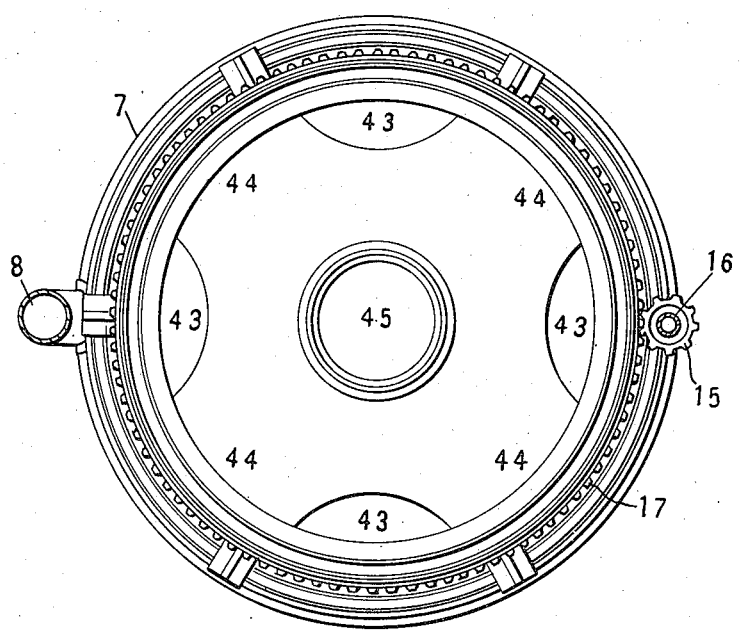
Figure 6:
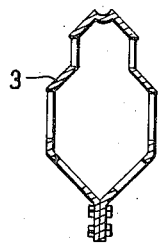
Figure 11:
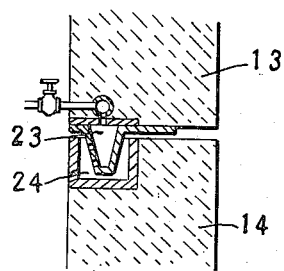
Figure 7:
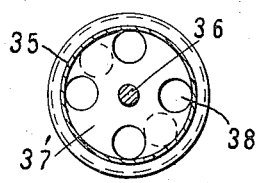
Figure 5:
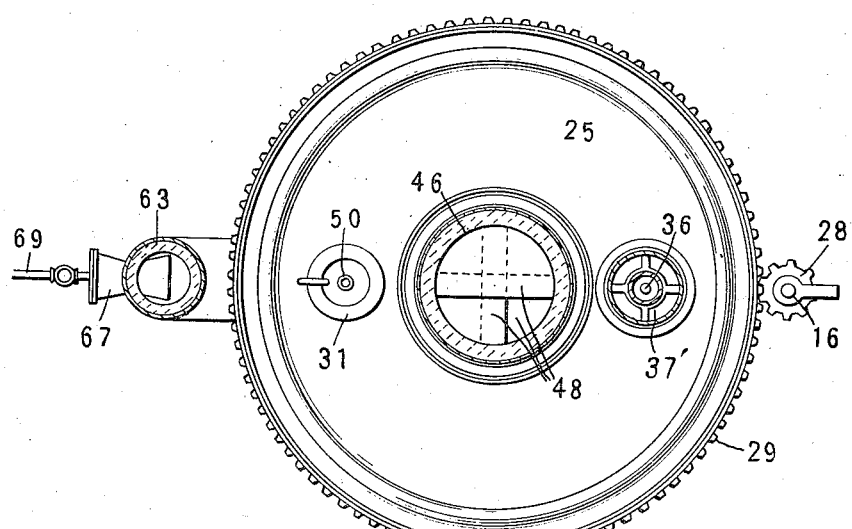
Figure 10:
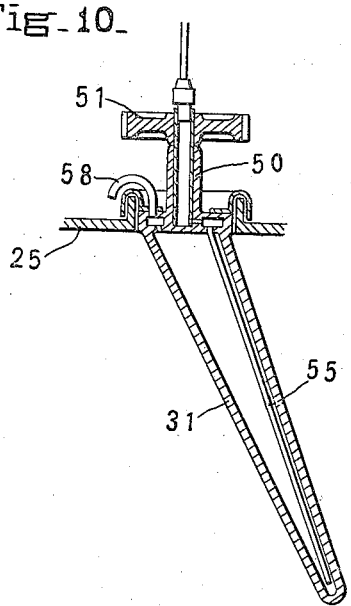
Figure 8:
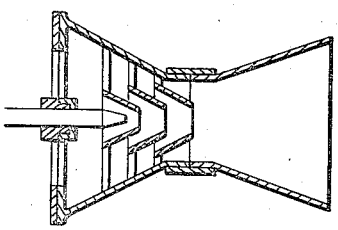
Figure 9:
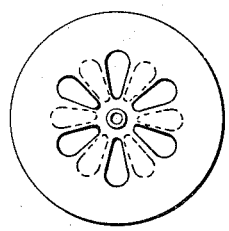

In the accompanying drawings wherein is illustrated one of various embodiments of my invention, Figure 1 is a view in vertical section of a producer constructed in accordance therewith. Fig. 2 is a similar view showing slightly different embodiments of certain of the component parts of the producer; Fig. 3 is a horizontal, sectional view taken substantially on the line 3—3 of Fig. 2; certain of the parts being broken away in the interest of clearness of illustration; Fig. 4 is a sectional view taken on the line 4—4 of Fig. 2; Fig. 5 is a similar view taken on line 5—5 of Fig. 2; Fig. 6 is a vertical, sectional view taken through one of the twyer boxes; Fig. 7 is a horizontal, sectional view taken on the line 7—7 of Fig. 2; Fig. 8 is a horizontal, sectional view taken on the line 8—8 of Fig. 2; Fig. 9 is a vertical, sectional view taken on the line 9—9 of Fig. 2; Fig. 10 is a vertical, sectional view taken through the poker, showing the manner in which a water circulation is maintained therethrough; Fig. 11 is a view in vertical section showing a different embodiment of seal which may be provided between certain of the relatively movable parts of the producer.

Similar reference characters refer to similar parts throughout the several figures of the drawing.

Referring now to the drawing, 1 represents the base or setting of the producer, said base being hollowed out as at 2 to provide a receptacle for the ashes and for the water which seals the lower end of the apparatus. The twyer boxes 3 in the embodiment illustrated in Fig. 1 are shown as radiating from the center, said boxes receiving the blast from a blast pipe 4 which extends upwardly through the base of the producer to the central portion of said boxes. In the embodiment shown in Fig. 2 the twyer boxes are shown as extending inwardly from the fixed lower section 5 of the producer, toward the center but terminating short thereof. These twyer boxes are adapted to receive the blast through pipes 6 from a bustle pipe 7 which encircles the lower portion of the producer. The bustle pipe in turn receives its blast from the vertical blast pipe 8. The twyer boxes it will be noted are supported beneath the water seal in order to prevent their supports 9 from becoming overheated, thus prolonging the life of said supports. The ashes deposited in receptacle may be removed in any desired manner but I preferably employ Archimedes screws 10, three of such screws being shown in the present instance, said screws delivering the ashes upon the traveling belt or carrier 11 encircling the lower portion of the producer and driven as by means of a pulley 12 which may be driven from any suitable source of power supply.

The producer which, in the present instance, is of cylindrical form is provided with a fixed upper section 13 between which and the lower fixed section 5 is provided a revoluble section 14, adapted to be rotated as by means of a gear wheel 15 upon the shaft 16 which meshes with peripheral teeth 17 located upon a revoluble section 14. Shaft 16 may be rotated from any suitable source of power supply, the means provided in the present instance being a shaft 18 having a beveled gear 19 meshing with a similar gear upon shaft 16. The upper fixed section 13 of the producer may be supported in any desired manner, for instance as by means of the supports 20. Seals as at 21 and 22 are provided between the revoluble section 14 and the fixed sections 5 and 13.

The top portion or cover 25 of the producer is mounted to revolve upon the top section 13, being supported in the present instance as by means of ball bearings 26. A water or other seal 27 is provided between the upper section and said cover for preventing the escape of gas. Cover 25 may be revolved by any suitable means as by the gear 28 upon the shaft 16 which meshes with peripheral teeth 29 provided upon the edge of the cover. The cover is provided with an aperture 30 through which extends a rotatable poker 31 the lower end of which is offset as shown, said poker being provided with a suitable apron 32, which dips into a water seal 33 located upon the cover. The cover is also provided with an aperture 34 through which extends a chute 35 said chute extending downwardly from its lower end into the producer from a hopper $35^1$. Extending downwardly through the hopper is a shaft 36 provided with a plurality of laterally projecting members 37 which are received between similar members extending inwardly from the inner walls of the hopper. Shaft 36 near its lower end is rigidly connected with the apertured plate $37^1$ which rests upon a similar plate 38 extending transversely of the hopper between the same and the chute. These two plates form a valve, so that when the apertures are in registry, fuel in the hopper falls into the producer and when said apertures are out of registry a closure will be effected between the interior producer and the hopper. Below the plate $37^1$ the shaft 36 is connected with the chute 35, so that as the shaft 36 is rotated the chute turns with it. A cover 39 is provided for hopper $35^1$. Shaft 36 extends through cover 39 and the upper end of said shaft is provided with a pinion 40 which meshes with the gear teeth 52 carried upon the gas exit conduit 41 extending upwardly from the producer.

Formed interiorly of the producer and supported upon the inner walls of the revoluble section 14 is a partition 42 said partition being arched as shown, and having semi-circular apertures 43 extending therethrough, which apertures form passage ways for the fuel and the gases. Four of these apertures are provided in the present instance, said apertures being formed between legs 44 which rest against the inner wall of the revoluble section 14. Leading upward from the aperture 45 formed in the central portion of the arch or partition 42 is a gas delivery conduit 46, the upper end of which terminates adjacent cover 25, and it will be observed that since partition 42 and conduit 46 are carried by section 14 they revolve with it. The conduit 41 which extends upward from the producer forms a continuation of the delivery conduit 46 and is joined thereto by means of the water seal 47. Suitable baffles 48 are provided in conduit 46.

A valve or damper 49 is provided in the conduit 41 by means of which the passage of gas from the producer may be shut off at will.

Poker 31 is provided with an upstanding hollow shaft 50 which carries a gear wheel 51 the latter meshing with the gear wheel 53 carried by the stationary conduit 41. It will be evident that when the cover 25 is rotated, and the poker rotated, the shaft 36, through gear wheel 40 and gear 52, will also be caused to rotate, so that the fuel is simultaneously distributed and agitated. A water circulation is maintained in poker 31 by means of an open ended pipe 55 extending downwardly into the poker, said pipe receiving its water supply by means of the hollow shaft 50 from a pipe $55^1$ which, in turn receives its supply from a trough 56 extending about conduit 41, said trough being suitably carried upon the cover portion 25. Water may be delivered to this trough as by means of a pipe 57. The water which is delivered into the poker flows upwardly and is discharged on top of the producer as by means of the pipe 58 connected with the upper end of the poker.

A blast pipe 59 leads into the upper portion of the producer and is provided with a suitable damper 60. This blast pipe leads from the conduit 61 which is positioned about the stationary gas conduit 41, conduit 61 leading from a source of air or carbonic acid gas supply. The object of positioning conduit about the gas discharge conduit is to heat the incoming air or other gas which is to be discharged into the producer. In Fig. 2 of the drawings I have shown spirally arranged baffles 62 within the conduit and interposed between the inner walls thereof and the exterior wall of the gas discharge conduit. This construction insures that a greater volume of the incoming air or other gas shall be brought into intimate contact with the gas discharge conduit, whereby a greater portion of the heat is extracted from the outgoing producer gas. Blast pipe 4 is provided with an upper extension or purge pipe 63 provided with a removable cover portion 64.

66 and 67 denote inspirators which lead into pipes 63 and 71, said inspirators being adapted to receive steam from pipes 68 and 69 connected with the pipe 70, the latter leading from any suitable source of steam supply.

The connecting portion 71 of blast pipe 4 which extends between inspirators 66 and 67, is suitably valved as at 72. Each of the inspirators may be provided with valves such as are indicated diagrammatically in Fig. 9, the purpose of which is to regulate the quantity of air admitted to the desired nicety.

Having thus described the construction of this embodiment of my invention the operation thereof which to a large extent should be obvious, is substantially as follows: The fuel which in the present instance is bituminous coal may be introduced into hopper 35¹ by suitable means as, for instance, a funnel 73 which may be independently supported above the producer, in such position that when the hopper 35¹ is underneath the same, fuel may be discharged into said hopper, and when a suitable quantity thereof has been introduced into the hopper said fuel may be ignited in the usual manner. When the apparatus is in operation the intermediate portion of the apparatus and the cover are rotated as above described. Inasmuch as chute 35 and poker 31 are carried upon the cover they will be rotated independently by the gear wheels 54 and 51 which mesh with the gear wheel 53 upon the stationary conduit 41. The fuel will therefore be evenly distributed upon the bed thereof in the upper section of the producer, and the poker being offset as shown will maintain the bed free of fissures or crevices which might otherwise be formed therein. The various dampers in the blast pipe may be regulated to admit the proper amount of air or gas both into the upper and lower parts of the producer. The gas formed in the upper portion of the producer passes downward through the aperture of the arch and mixes with that passing upward through the bed. The gases thereupon pass upward through conduit 46 which leads from the central portion of arch 42 and it will be observed that this conduit forms a mixing chamber located entirely within the producer. It will accordingly be seen I have provided a construction well adapted, among others, to attain the several ends and objects of the invention in a simple yet efficient manner.

It will be obvious that by reason of the connection shown between the blast pipes and the producer, gases of various qualities and compositions may be produced. For instance a sufficient quantity of steam may be discharged into the bottom of the producer to produce water gas which gas, will mix with the rich hydrocarbon gases passing downward through the arch to form a gas of high calorific power.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which as a matter of language might be said to fall therebetween.

Having described my invention, what I claim as new and desire to secure by Letters Patent, is:

1. The combination of a gas producer having stationary portions, an intermediate revoluble body portion, a revoluble cover portion, and a fuel reservoir carried by the cover portion.

2. The combination of a gas producer having stationary portions, an intermediate revoluble body portion, a revoluble cover portion, a fuel reservoir carried by the cover portion, and means for revolving the fuel reservoir.

3. The combination of a gas producer, having fixed upper and lower body portions, an intermediate revoluble body portion, and an apertured arch portion carried by the revoluble portion.

4. The combination of a gas producer having fixed upper and lower body portions, an intermediate revoluble body portion, an apertured arch portion carried by the revoluble portion, a revoluble cover portion, and a fuel reservoir carried by the cover portion.

5. The combination of a gas producer having fixed upper and lower body portions, of a revoluble intermediate body portion, an apertured arch portion within the revoluble portion and carried thereby, and a gas discharge conduit leading from said arch portion.

6. The combination of a gas producer having fixed upper and lower body portions, of a revoluble intermediate body portion, an apertured arch portion within the revoluble portion and carried thereby, a gas discharge conduit leading from said arch portion, a revoluble cover portion and a fuel reservoir carried by the cover portion.

7. The combination of a gas producer having fixed upper and lower body portions, and a cover portion, of a revoluble intermediate body portion, an apertured arch portion within the revoluble portion and carried thereby, a gas discharge conduit leading from said arch portion and a poker carried by the cover portion.

8. The combination of a gas producer having fixed upper and lower body portions, and a cover portion, of a revoluble intermediate body portion, an apertured arch portion within the revoluble portion and carried thereby, a gas discharge conduit leading from said arch portion, and an inclined poker carried by the cover portion.

9. The combination of a gas producer having fixed upper and lower body portions, and a cover portion, of a revoluble intermediate body portion, an apertured arch portion within the revoluble portion and carried thereby, a gas discharge conduit leading from said arch portion, and a revoluble inclined poker carried by the cover portion.

10. The combination of a gas producer having fixed top and bottom portions, of a revoluble intermediate body portion, a revoluble cover portion, and an independently revoluble inclined poker carried by the cover portion.

11. The combination in a gas producer, of fixed upper and lower body portions, and a revoluble intermediate body portion, blast conduits leading to both of said fixed body portions, a gas exit conduit leading from said intermediate body portion, a revoluble cover portion, a hopper mounted upon the cover portion adapted to discharge fuel into the upper body portion, and a poker carried by said cover portion adapted to stir said fuel.

12. The combination in a gas producer, of fixed upper and lower body portions and an intermediate revoluble body portion, seals provided between the fixed body portions, and the revoluble body portion, blast pipes leading into the fixed body portions, a discharge conduit leading from the intermediate portion, baffles located in said discharge pipe, a revoluble cover portion, a revoluble fuel receptacle carried by the cover portion, a revoluble inclined poker carried by the cover portions, a fixed gas discharge conduit leading from the producer, and means upon the latter discharge conduit for rotating said poker and said hopper during the rotation of said cover portions.

13. The combination of a gas producer having a revoluble cover portion, means for revolving it, a revoluble fuel distributing member carried by the cover portion and extending downwardly into the producer, and means for revolving the distributer.

14. A gas producer having a body portion and a cover portion one of which is revoluble, means for revolving said revoluble member, a revoluble feed device carried by the cover portion eccentrically of the producer body and projecting downwardly therefrom into the producer body, and means for revolving said feed device.

15. In a gas producer having upper and lower body portions, an intermediate revoluble body portion, an apertured partition extending across said intermediate portion, and a gas conduit leading from the intermediate section of the producer below the partition.

16. A gas producer having upper and lower sections and an intermediate section, an apertured partition extending across the intermediate section, one of the two last named elements being rotatable and a gas conduit leading from the intermediate section below the partition.

17. In a gas producer an upper section and a lower section, an intermediate section, a gas-collecting chamber extending into the intermediate section and having inlets below the line of division between the upper section and the intermediate section, said chamber and said intermediate section being relatively rotatable, and a gas conduit leading from the chamber.

18. A gas producer having therein a gathering and mixing chamber having a gas inlet at the bottom and extending toward the walls of the producer, means for causing relative rotative movement between said mixing chamber and the adjacent walls of the producer, whereby the gas inlet into the mixing chamber is kept open by the elimination of tendency to caking of the fuel or forming clinkers or ashes, and a gas conduit leading from said mixing chamber.

In witness whereof I affix my signature in the presence of two witnesses.

JAMES A. HERRICK.

Witnesses:
 A. HONIGSBERG,
 M. BUSCHER.